US010800001B2

(12) United States Patent
Grinko

(10) Patent No.: US 10,800,001 B2
(45) Date of Patent: *Oct. 13, 2020

(54) METHOD FOR DRESSING OF A GRINDING WORM BY MEANS OF A DRESSING ROLL AND DRESSING ROLL

(71) Applicants: KAPP Werkzeugmaschinen GmbH, Coburg (DE); NILES Werkzeugmaschinen GmbH, Berlin (DE)

(72) Inventor: Sergiy Grinko, Coburg (AT)

(73) Assignees: KAPP WERKZEUGMASCHINEN GMBH, Coburg (DE); NILES WERKZEUGMASCHINEN GMBH, Berlin (DE)

(*) Notice: Subject to any disclaimer, the term of this patent is extended or adjusted under 35 U.S.C. 154(b) by 381 days.

This patent is subject to a terminal disclaimer.

(21) Appl. No.: 15/820,005

(22) Filed: Nov. 21, 2017

(65) Prior Publication Data
US 2018/0147692 A1 May 31, 2018

(30) Foreign Application Priority Data
Nov. 28, 2016 (DE) .................. 10 2016 014 181

(51) Int. Cl.
B24B 53/075 (2006.01)
B24B 53/14 (2006.01)
(Continued)

(52) U.S. Cl.
CPC .............. B24B 53/075 (2013.01); B23F 5/04 (2013.01); B23F 13/04 (2013.01); B23F 21/02 (2013.01);
(Continued)

(58) Field of Classification Search
CPC ..... B24B 53/017; B24B 53/04; B24B 53/053; B24B 53/075; B24B 53/085; B24B 53/12;
(Continued)

(56) References Cited
U.S. PATENT DOCUMENTS 2,126,990 A * 8/1938 Graves .................... B23F 13/06
409/51
2,162,836 A * 6/1939 Candee ................. B24B 53/085
125/11.01
(Continued)

FOREIGN PATENT DOCUMENTS

DE 9107089 U1 8/1991
DE 19910746 A1 9/2000
(Continued)

OTHER PUBLICATIONS

Office Action dated Apr. 16, 2018 from corresponding European Patent Application No. EP 17202465.5.

Primary Examiner — Eileen P Morgan
(74) Attorney, Agent, or Firm — Lucas & Mercanti, LLP; Klaus P. Stoffel

(57) ABSTRACT

A method for dressing a grinding worm using a dressing roll that engages the grinding worm to profile its helical grinding profile. The dressing roll is produced by: a) producing a disk-shaped base body a profiled surface for receiving a layer of abrasive particles, wherein the surface is at least partially tooth-shaped in a radial cross section, b) positioning the abrasive particles on the profiled surface, c) profiling the base body provided with abrasive particles by removing outer sections of the abrasive particles with a profiling tool so that the abrasive profile of the dressing roll is created. Production of the profiled surface takes place in step a) so that the distance between the profiled surface and the abrasive profile changes during advancing from the root
(Continued)

region to the tip region at a flank of the tooth-shaped surface, measured in the radial cross section perpendicular to the profiled surface.

9 Claims, 6 Drawing Sheets

(51) Int. Cl.
    *B24B 53/017*     (2012.01)
    *B24B 53/053*     (2006.01)
    *B24D 18/00*     (2006.01)
    *B23F 5/04*     (2006.01)
    *B23F 21/02*     (2006.01)
    *B23F 13/04*     (2006.01)
    *B24B 53/12*     (2006.01)
    *B23F 23/12*     (2006.01)

(52) U.S. Cl.
CPC .......... *B23F 23/12* (2013.01); *B23F 23/1225* (2013.01); *B24B 53/017* (2013.01); *B24B 53/053* (2013.01); *B24B 53/12* (2013.01); *B24B 53/14* (2013.01); *B24D 18/00* (2013.01); *B24D 18/0018* (2013.01)

(58) Field of Classification Search
CPC .... B24B 53/14; B23F 5/02; B23F 5/04; B23F 5/06; B23F 13/04; B23F 21/02; B23F 21/026; B23F 23/12; B23F 23/1225; B24D 18/00; B24D 18/0009; B24D 18/0018
USPC ...................... 451/47, 56, 253, 443
See application file for complete search history.

(56) References Cited

U.S. PATENT DOCUMENTS

| | | | | |
|---|---|---|---|---|
| 4,502,456 A * | 3/1985 | Janutta | ............... | B23F 21/02 125/11.03 |
| 4,993,194 A * | 2/1991 | Cadisch | ............... | B24B 53/075 451/253 |
| 5,954,568 A * | 9/1999 | Wirz | ............... | B24B 53/075 125/11.01 |
| 6,012,972 A * | 1/2000 | Jankowski | ............... | B24B 53/075 451/47 |
| 6,146,253 A * | 11/2000 | Litvin | ............... | B23F 15/06 451/47 |
| 8,597,085 B2 * | 12/2013 | Rudolf | ............... | B24B 53/075 451/443 |
| 2005/0239385 A1 * | 10/2005 | Jankowski | ............... | B23F 21/026 451/540 |
| 2010/0272534 A1 * | 10/2010 | Yanase | ............... | B23F 23/1225 409/1 |
| 2017/0008105 A1 * | 1/2017 | Wuerfel | ............... | G05B 19/186 |
| 2017/0008109 A1 * | 1/2017 | Wuerfel | ............... | B23F 23/1225 |
| 2017/0008148 A1 * | 1/2017 | Wuerfel | ............... | B24B 53/083 |
| 2017/0136563 A1 * | 5/2017 | Wirz | ............... | B23F 23/1231 |

FOREIGN PATENT DOCUMENTS

| | | |
|---|---|---|
| DE | 102010045836 A1 | 3/2012 |
| JP | 2005-271127 A | 10/2005 |
| JP | 2006212726 A | 8/2006 |
| JP | 2010090783 A | 5/2010 |

\* cited by examiner

METHOD FOR DRESSING OF A GRINDING WORM BY MEANS OF A DRESSING ROLL AND DRESSING ROLL

CROSS-REFERENCE TO RELATED APPLICATIONS

The present application claims priority of DE 10 2016 014 181.6, filed Nov. 28, 2016, the priority of this application is hereby claimed and this application is incorporated herein by reference.

BACKGROUND OF THE INVENTION

The invention relates to a method for dressing of a grinding worm by means of a dressing roll in which the dressing roll, which is provided with an abrasive profile, is brought into engagement with the grinding worm to profile its helical grinding profile, wherein the abrasive profile of the dressing roll is at least partially designed tooth-shaped in a radial cross section and extends radially from a root region to a tip region, wherein the dressing roll is produced by the steps:
 a) producing of a disk-shaped base body, wherein the base body is provided with a profiled surface for the reception of a layer of abrasive particles, wherein the surface is at least partially tooth-shaped in a radial cross section,
 b) positioning of a layer of abrasive particles on the profiled surface of the base body,
 c) profiling of the base body which is provided with abrasive particles by removing outer sections of the abrasive particles with a profiling tool in such a manner that the abrasive profile (should-be profile) of the dressing roll is created.

Furthermore, the invention relates to a dressing roll.

At the hard fine finishing of gears or profiles, especially in the case of a mass or line production, often dressable grinding worms are used as grinding tools. To maintain the required quality of the gear which has to be produced, i. e. to compensate wear of the grinding worm and also to supply the desired or required surface structure of the grinding areas of the grinding worm, dressing rolls are employed which are mostly coated with diamonds.

At the above mentioned production of such a dressing roll a precise ground steel base body is coated with a layer of abrasive particles mostly in the form of diamond grains by means of a galvanic process.

In dependence from the quality of the coating with abrasive particles and of the demanded surface quality of the gear which has to be ground the profile of the dressing roll must be reworked. The rework takes place for example on a coordinate grinding machine by means of diamond grinding disks accordingly, wherein the envelope of the abrasive particles of the dressing roll is supplied with the theoretical given profile.

Depending on the feed at the reworking relatively equal values for the material part are created along the height of the flank of the dressing roll (i. e. from the root region to the tip region, see above). Accordingly, at the dressing of the grinding worm by use of a dressing roll which is produced in such a manner relative equal values of the material part are created along the height of the flank of the grinding worm.

When the dressing roll is completed in the mentioned manner its profile is transferred to the grinding worm during dressing of the grinding worm and then during grinding of the workpiece consequently the profile of the worm flanks of the grinding worm are transferred to the tooth-shaped workpiece which has to be ground by the generative grinding process. Accordingly, the surface roughness is also relatively equal in different regions of the gear flank.

This process is illustrated in FIG. 1. Here, the radial cross section of a part of a dressing roll 1 can be seen which is designed as a disk-shaped body and which rotates around an axis of rotation a during dressing. The dressing roll has a tooth-shaped profile in the radial outer region which extends from a root region 3 to a tip region 4 in radial direction r. The base body 5 of the dressing roll 1 is a steel base body and is at first provided with a profiled surface 6. The shape of this surface 6 corresponds to the later desired final profile 2 of the dressing roll, however it lies back to the abrasive profile 2 by a distance x—measured perpendicular to the surface 6.

The base body 5 or, more precisely, the surface 6 is coated with a layer of abrasive particles 7 which firstly project outward with its outer end region beyond the desired abrasive profile 2. Therefore, the profiling of the dressing roll 1 is carried out by means of a profiling tool 8, wherein outer sections 9 of the abrasive particles 7 are removed and so the desired profile 2 is created. So, both flanks 10 and 11 of the profile 2 and the dressing roll 1 respectively are finished. Schematically shown is the surface region A of the abrasive particles which is given or is available for the dressing process at the finished dressing roll (depicted is with "A" the width in the radial cross section; in the direction perpendicular to the plane of projection a respective depth of the abrasive particles, so that in total an area is given).

Conceptual, substantial the same equal surface roughness of the dressing roll is given along the whole radial extension of the profile 2 so that the same applies also for the finished workpiece via the dressing of the grinding worm and the grinding of a gear with the same. However, this is not desired in each case.

Sometimes, it is desired that a variable surface roughness of the ground tooth flank along the tooth height is given.

SUMMARY OF THE INVENTION

It is the object of the invention to further develop a generic method in such a manner and to provide a respective dressing roll by which it is possible to selectively influence the surface roughness of the ground tooth flank along the tooth height, which should be reached by selectively influencing the employed material part of the abrasive material along the height of the flank of the dressing roll.

The solution of the object by the invention provides that the production of the profiled surface takes place according to above step a) in such a manner that the distance between the profiled surface and the abrasive profile (should-be profile of the dressing roll) is changing during advancing from the root region to the tip region at least at one flank of the tooth-shaped surface, measured in the radial cross section perpendicular to the profiled surface.

Thereby, it is especially provided that the size of the surface region of the abrasive particles is changing during advancing from the root region to the tip region at least at one flank of the tooth-shaped surface (preferably continuously).

Thereby, it can be provided that the production of the profiled surface according to above step a) is taking place in such a manner that the distance between the profiled surface and the abrasive profile is increasing or decreasing during advancing from the root region to the tip region. Thereby, the increase or the decrease of the distance at both flanks of the tooth-shaped surface can be equal.

It is also possible that the production of the profiled surface according to above step a) is taking place in such a manner that the distance between the profiled surface and the abrasive profile is increasing at one flank of the tooth-shaped surface and is decreasing at the other flank of the tooth-shaped surface during advancing from the root region to the tip region.

Said increase or decrease of the distance can thereby take place linear during advancing from the root region to the tip region.

But it can also take place non-linear, wherein then it can especially be provided that the increase or the decrease of the distance during advancing from the root region to the tip region takes place in such a manner that a convex (parabolic) design for the distance along the profiled surface is created. Alternatively, it can be provided that the increase or the decrease of the distance takes place in sections linear but with different linearity.

The dressing roll for dressing of a grinding worm which has a disk-shaped base body with a profiled surface which is at least in sections tooth-shaped in a radial cross-section, wherein the surface extends radially from a root region to a tip region and wherein the surface is provided with a layer of abrasive particles, wherein outer end regions of the abrasive particles form an abrasive profile is characterized by the invention that the abrasive particles form a surface region for forming of the abrasive profile which size is changing during advancing from the root region to the tip region (at least at one flank of the tooth-shaped surface).

Thus, the present invention provides a method for the production of a dressing roll and a dressing roll to dress with the same a dressable grinding worm in such a manner that with the same the creation of a variable surface roughness along the height of a tooth of a gear-shaped workpiece becomes possible.

Thereby it becomes possible to provide a tool (dressing roll) for dressing of a dressable grinding worm with a variable material part along the height of the flank so that also the dressable grinding worm is created with a variable material part along the height of the flank and by doing so then furthermore a variable surface roughness along the height of the tooth of the workpiece which has to be ground can be produced.

Thus, with the proposed solution it is possible that specific desires and specifications respectively with respect to the surface of the flank of a toothing can be fulfilled; namely the tooth flank can be machined in such a manner that the surface roughness along the height of the tooth is given in a desired way. For doing so the method and the dressing roll according to the invention is employed with the specification of a selective variable material part along the height of the flank.

To summarise, the concept according to the invention can again be formulated as follows:

At the design of the base body of the dressing roll a willful "wrong" tool profile is used as basis. After the coating of the base body with a layer of abrasive particles (i. e. especially with boron nitride (CBN) or diamond grains of equal size and/or granularity) the dressing tool (dressing roll) is reworked as described with a (diamond) grinding wheel. But the rework does not take place with an equal distance between the profile of the base body and the abrasive profile which has to be created, but according to be "right" given profile. Thus, at the end of the process the flank lines of the base body at the one hand and the reworked profile at the other hand are not parallel to another. Basing on the effect that all abrasive grains which form the layer on the base body have the same grain size, i. e. about the same dimension, the single abrasive grains are accordingly removed differently during the rework.

It should be mentioned for sake of clarity that also when a defined grain diameter is chosen for the coating of the base body always only a certain diameter range for the grains is given, i. e. the grains have never all the same diameter; but this is not hindering. To the contrary it can be beneficial to use a mixed grain which comprises grains of a certain diameter range.

By doing so different values for the material part which is forming the cutting edges are created in different regions of the dressing roll surface along the flank height.

Then, at the dressing of the grinding worm consequently the dressing tool profile is reproduced respectively with variable material part in each thread of the grinding worm. Then, at the grinding the further transfer of the variable material part onto the flank of the tooth of the gear of the workpiece to be ground takes place.

Of course the proposed concept can be employed for the dressing of a single-thread as well as of a multi-thread grinding worm.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
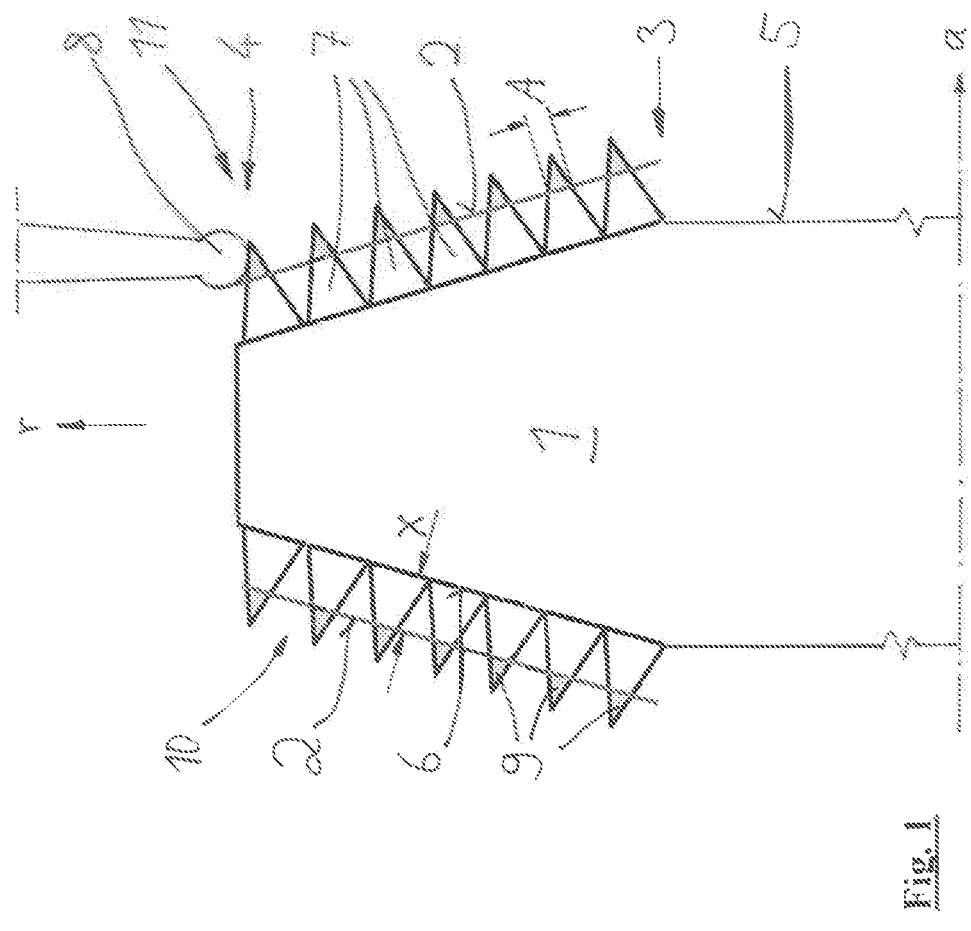
FIG. 1 shows schematically the radial cross section of a dressing roll for the dressing of a grinding worm, wherein the method according to the state of the art is depicted.
Figure 2:
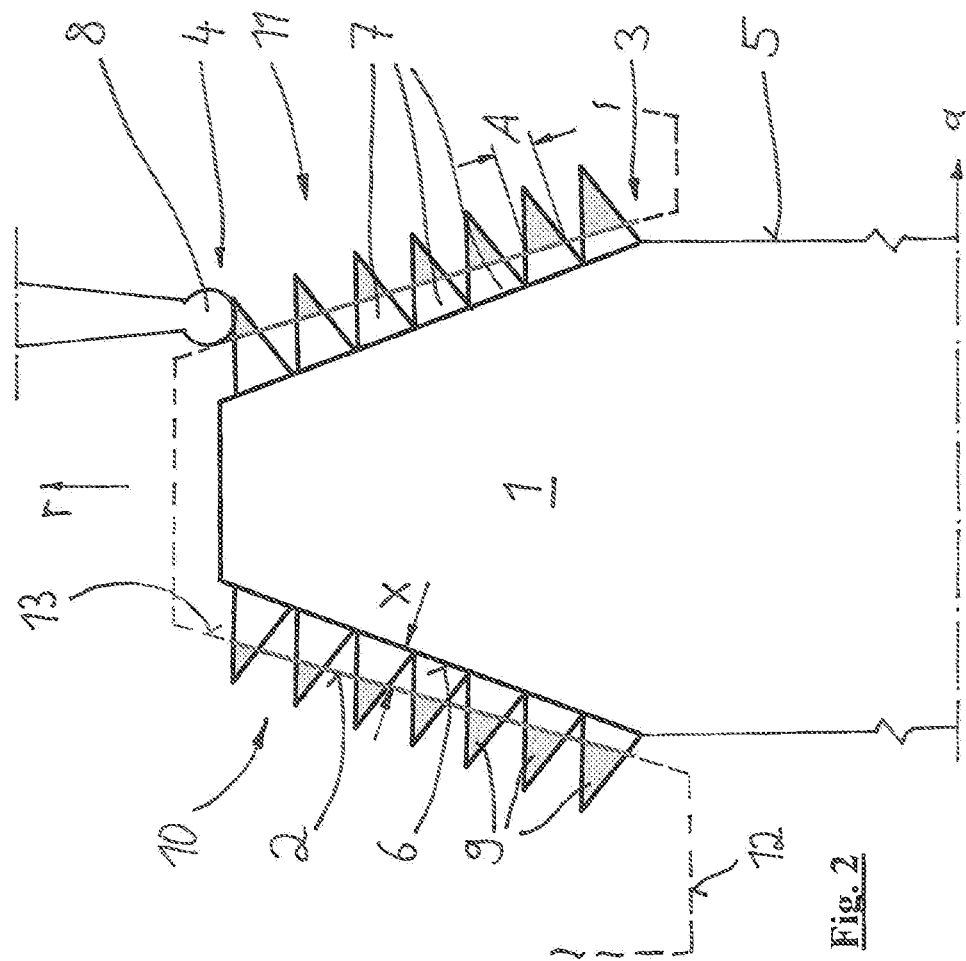
FIG. 2 shows schematically the radial cross section of a dressing roll for the dressing of a grinding worm, wherein the method according to the invention and according to a first embodiment is depicted.

The principle of the present invention can be described by comparing FIG. 1 (solution according to the state of the art) and FIG. 2 (embodiment according to the invention):

At first a dressing roll 1 is produced by at first profiling a base body 5 (consisting of massive steel). Thereby the tooth-shaped region between the root region 3 and the tip region 4 is provided by a profiled surface 6. Then, on this surface 6 a layer of abrasive particles 7 is applied and fixed by means of a galvanically deposited material on the base body 5. The single abrasive particles 7 have substantially the same size and consequently form a layer with constant thickness along the surface 6.

At the subsequent profiling of the dressing roll 1 by means of a profiling tool 8 the outer sections 9 of the abrasive particles 7 are removed so that the required abrasive profile 2 is generated for dressing of a grinding worm 12 with a helical grinding profile 13 (see FIG. 2).

Thereby, it is essential that said production of the profiled surface 6 takes place in such a manner that the distance x between the profiled surface 6 and the abrasive profile 2 (final profile) is changing during advancing from the root region 3 to the tip region 4 at least at one flank 10 and 11 respectively of the tooth-shaped surface 6—measured in the radial cross section perpendicular to the profiled surface. This can be seen in FIG. 2 quite easy as here the exemplary straight run of the surface 6 and of the abrasive profile 2 are not parallel in the radical cross section but are arranged under an angle to another. This is not the case at the solution according to the state of the art; here, the surface 6 and the profile 2 are parallel to another.

The consequence of this process is that the cutting regions of the abrasive particles 7 have different surface regions A along the height of the tooth after the profiling of the dressing roll 1. In the embodiment according to FIG. 2 said surface region is bigger for the radial inner abrasive particles 7 than for the radial outer particles.

In the further figures variations of the embodiment according to FIG. 2 are shown.

Figure 3:
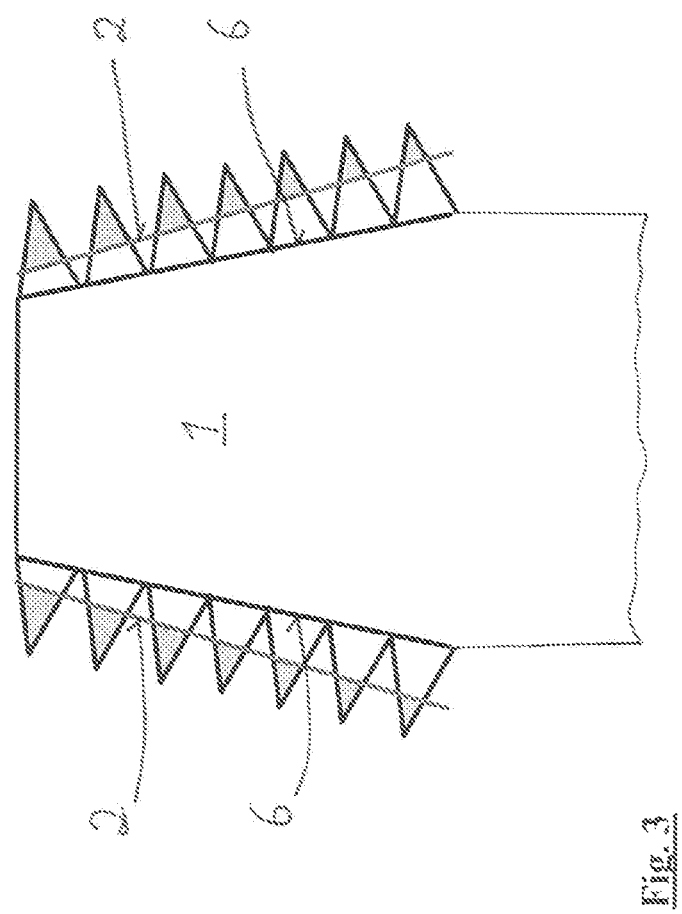
FIG. 3 shows in the depiction of FIG. 2 a second embodiment according to the invention.

At the solution according to FIG. 3 it is provided that also an angular run between the surface 6 and the profile 2 is given, however now the surface regions A increase when advancing in the radial outer direction (in FIG. 2 they decreased).

Figure 4:
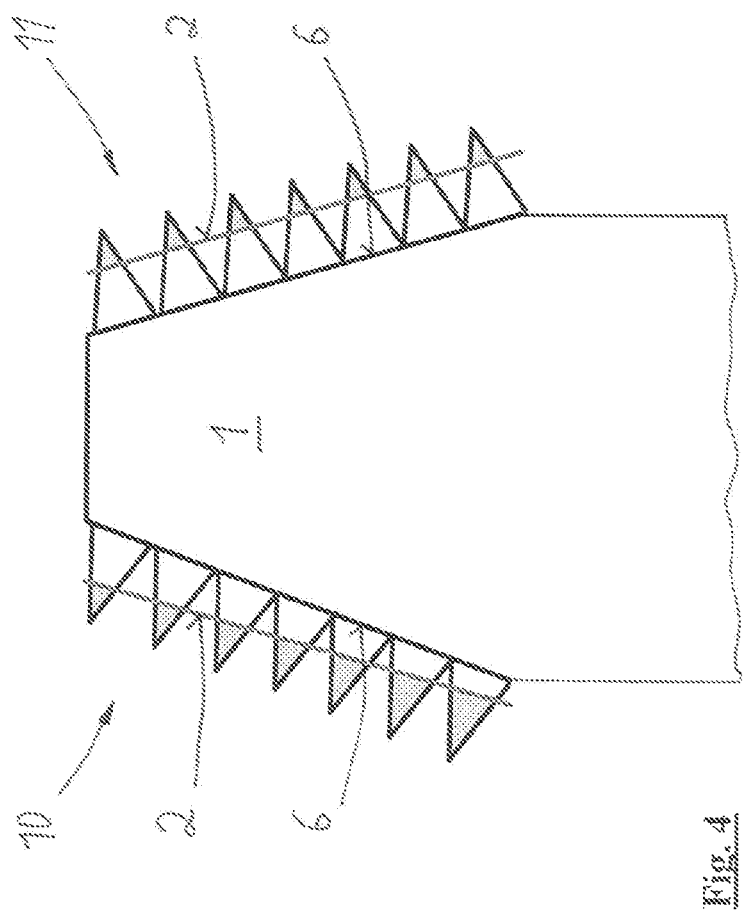
FIG. 4 shows in the depiction of FIG. 2 a third embodiment according to the invention.

FIG. 4 shows that the proposed measure needs not necessarily be applied to both flanks 10 and 11 in the same manner. Rather only the flank 10 has the design according to the invention while the flank 11 is designed according to the state of the art (see FIG. 1).

Figure 5:
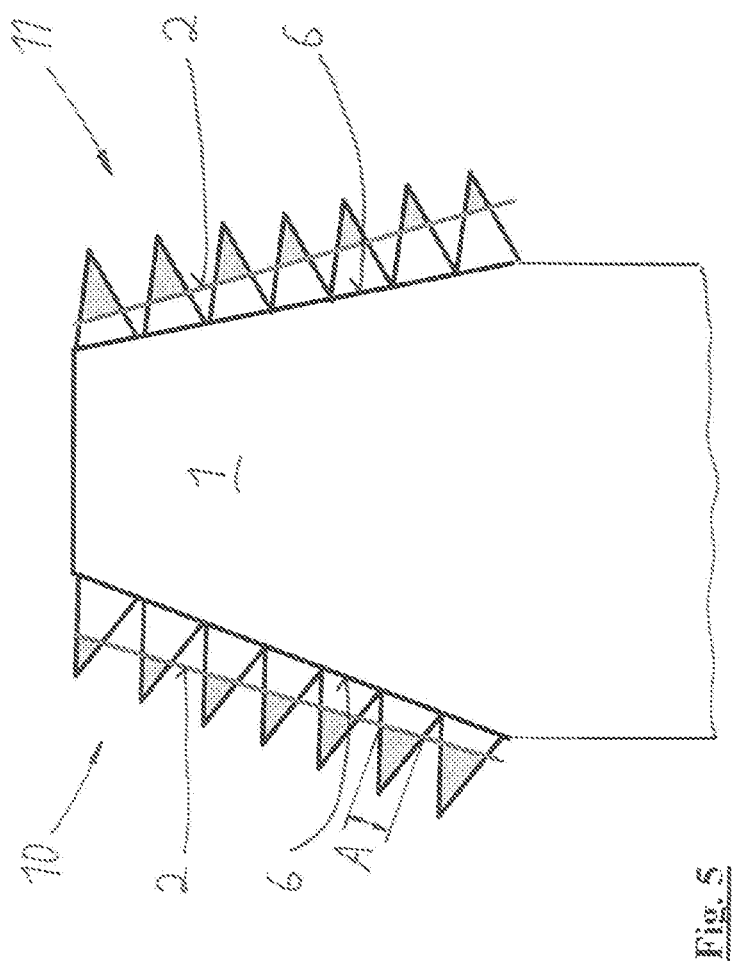
FIG. 5 shows in the depiction of FIG. 2 a fourth embodiment according to the invention and FIG. 6 shows in the depiction of FIG. 2 a fifth embodiment according to the invention.

In FIG. 5 it can be seen that the increase and decrease respectively of the surface region A can be oriented differently at the both flanks 10 and 11: While at the flank 10 the surface region A decreases with gaining radial distance from the axis of rotation a (see FIG. 2) it increases at the flank 11.

Figure 6:
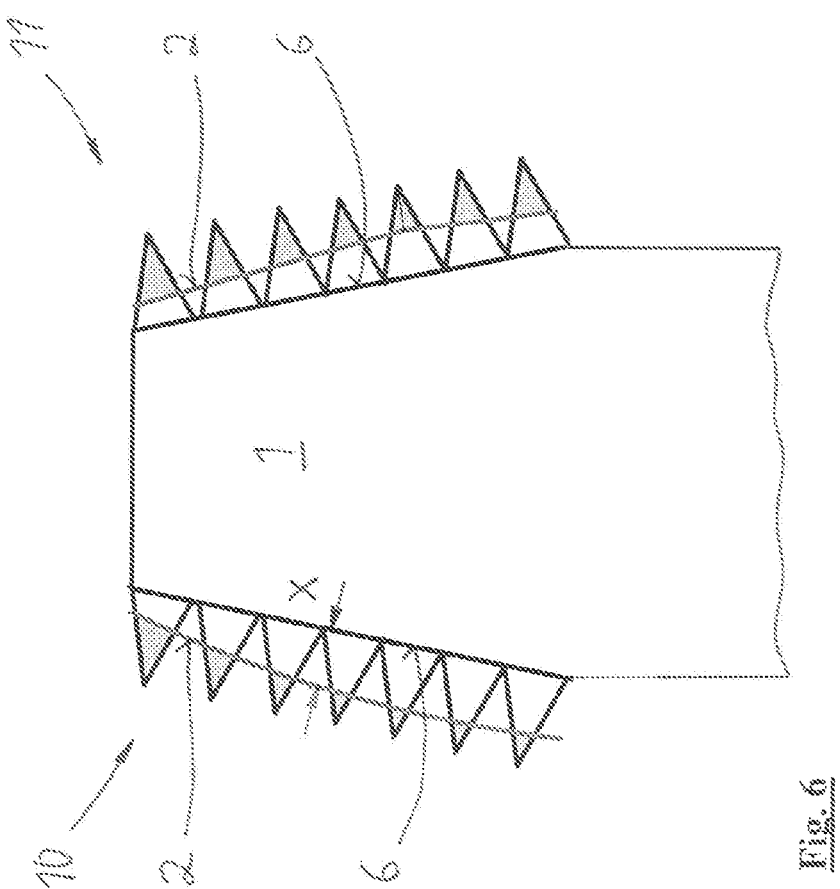

Finally FIG. 6 shows that the distance x between the profiled surface 6 and the abrasive profile 2 needs not necessarily increase or decrease linear. At the flank 10 a spherical (parabolic) run is provided for the distance x along the height of the tooth. At the flank 11 segmented regions are provided within which a linear run for the increase and decrease respectively for the distance x is given, however oriented inversely arranged.

It should be mentioned explicitly that the single solutions according to the embodiments of FIGS. 2 to 6 can also be employed in any combination.

While specific embodiments of the invention have been shown and described in detail to illustrate the inventive principles, it will be understood that the invention may be embodied otherwise without departing from such principles.

I claim:

1. A method for producing a dressing roll and dressing a grinding worm with the dressing roll, comprising the steps of:
    producing the dressing roll by:
    a) producing a disk-shaped base body, wherein the base body is provided with a profiled surface for reception of a layer of abrasive particles, wherein the surface is tooth-shaped in a radial cross section and extends radially from a root region to a tip region,
    b) positioning a layer of abrasive particles on the profiled surface of the base body, and
    c) profiling of the base body which is provided with abrasive particles by removing outer sections of the abrasive particles with a profiling tool so that the abrasive profile of the dressing roll is created, wherein
    the production of the profiled surface takes place according to step a) in such a manner that the distance between the profiled surface and the abrasive profile is changing by either increasing or decreasing during advancing from the root region to the tip region at least at one flank of the tooth-shaped surface, measured in the radial cross section perpendicular to the profiled surface; and
    bringing the dressing roll into engagement with the grinding worm to profile a helical grinding profile in the grinding worm.

2. A method according to claim 1, wherein the production of the profiled surface of the base body of the dressing roll according to step a) takes place in such a manner that the distance between the profiled surface and the abrasive profile is increasing during advancing from the root region to the tip region, measured in the radial cross section perpendicular to the profiled surface.

3. A method according to claim 1, wherein the production of the profiled surface of the base body of the dressing roll according to step a) takes place in such a manner that the distance between the profiled surface and the abrasive profile is decreasing during advancing from the root region to the tip region, measured in the radial cross section perpendicular to the profiled surface.

4. A method according to claim 2, wherein the increase or the decrease of the distance at both flanks of the tooth-shaped surface is equal.

5. A method according to claim 1, wherein the production of the profiled surface of the base body of the dressing roll according to step a) takes place in such a manner that the distance between the profiled surface and the abrasive profile is increasing at one flank of the tooth-shaped surface and is decreasing at the other flank of the tooth-shaped surface during advancing from the root region to the tip region, measured in the radial cross section perpendicular to the profiled surface.

6. A method according to claim 1, wherein the increase or the decrease of the distance takes place linear during advancing from the root region to the tip region.

7. A method according to claim 1, wherein the increase or the decrease of the distance takes place non-linear during advancing from the root region to the tip region.

8. A method according to claim 7, wherein the increase or the decrease of the distance during advancing from the root region to the tip region takes place in such a manner that a convex design for the distance along the profiled surface of the base body of the dressing roll is created.

9. A method according to claim 7, wherein the increase or the decrease of the distance takes place in sections linear but with different linearity.

\* \* \* \* \*